(12) United States Patent
Grosskrueger et al.

(10) Patent No.: US 6,823,918 B2
(45) Date of Patent: Nov. 30, 2004

(54) INTEGRALLY REINFORCED COMPOSITE SANDWICH JOINT AND PROCESS FOR MAKING THE SAME

(75) Inventors: Duane D. Grosskrueger, Highlands Ranch, CO (US); Keith Y. Hora, Westminster, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 19 days.

(21) Appl. No.: 10/036,237

(22) Filed: Dec. 28, 2001

(65) Prior Publication Data

US 2003/0124287 A1 Jul. 3, 2003

(51) Int. Cl.[7] .............................................. B29C 35/02
(52) U.S. Cl. ...................... 156/429; 156/431; 156/449; 156/598
(58) Field of Search .......................... 138/144; 156/429, 156/431, 449, 598, 173, 175, 189, 190, 191

(56) References Cited

U.S. PATENT DOCUMENTS

| | | | |
|---|---|---|---|
| 4,793,727 A | 12/1988 | Schmaling | .................. 403/340 |
| 5,895,699 A | 4/1999 | Corbett et al. | .............. 428/116 |
| 5,935,704 A | * 8/1999 | Happy | ......................... 428/361 |

\* cited by examiner

Primary Examiner—Sandra M. Nolan
(74) Attorney, Agent, or Firm—Marsh Fischmann & Breyfogle LLP

(57) ABSTRACT

The present invention generally relates to a multi-layered structure which for a given external geometry a section of interest may be integrally reinforced by varying the relative proportions of the layers in that section. That is, the layers making up the structure may have varying relative proportions to the structure's overall thickness between two or more positions while the structure maintains a constant thickness between the positions. By varying the relative proportions of the structure's layers, the mechanical properties of the structure may be selectively altered from a first position to a second position without altering the structure's external profile. This is especially desirable in composite sandwich structures used in aerospace applications which often require additional reinforcement at structural interfaces. By adjusting the relative proportions of the composite sandwich structure's layers, one or more structurally enhanced sections may be created for structural interfaces without altering the structure's profile.

10 Claims, 9 Drawing Sheets

INTEGRALLY REINFORCED COMPOSITE SANDWICH JOINT AND PROCESS FOR MAKING THE SAME

FIELD OF THE INVENTION

The present invention generally relates to a composite sandwich structure having outer fiber reinforced composite layers separated by a lightweight core. More particularly, the present invention relates to integrally reinforcing a section of the composite sandwich structure, e.g., by changing the thickness or proportions of one or more layers of the sandwich structure, to provide a stiffened section for a structural interface. The invention has particular advantages for constructing sidewalls of launch vehicles or other aerospace applications.

BACKGROUND OF THE INVENTION

Reinforced composite sandwich structures typically have outer fiber reinforced composite layers separated by a lightweight core made up of metallic or non-metallic honeycomb, structural foams and/or wooden fibers. The outer fiber reinforced composite layers, or face sheets, are generally separated by and connected to the core, which is usually less stiff and less dense than the face sheets. These composite sandwich structures are widely used today in aerospace applications due to their high stiffness-to-weight (i.e., specific stiffness) and strength-to-weight (i.e., specific strength) ratios. The face sheets generally comprise a fiber reinforced resin matrix composite that incorporates strong stiff fibers, such as carbon fiber, into a softer, more ductile resin matrix. The resin matrix material transmits forces to the fibers and provides ductility and toughness while the fibers carry most of the applied force. In the case of composite sandwich structures, the behavior of the face sheets is analogous to the flange of a structural I-beam while the behavior of the core is analogous to the web of the I-beam. In this regard, the face sheets carry the applied loads and the core transfers the load from one face sheet to the other.

Though composite sandwich structures provide increased strength-to-weight ratios compared to, for example, metallic structures, there are several important limitations to use of such composite structures. Composite structures depend primarily on the fiber reinforcement in the resin matrix for their high specific strength and stiffness. These composite structures generally have limited in-plane compressive strength (bearing strength) and may not have the strength to absorb highly localized stress loads, especially when those loads are applied substantially perpendicular to the composite structure. For example at a structural interface a fastener, such as a bolt, passing through the cross sectional area of a composite sandwich structure may provide a localized stress concentration and/or a point load on one or both of the face sheets. In this regard, the composite sandwich structure must provide adequate bearing strength and compressive strength to resist tearing of the face sheets and/or crushing of the core while providing required structural properties to distribute the point load across the structure's surface without failing.

In order to provide the necessary structural integrity necessary at, for example, structural interfaces, additional composite material layers are typically added to the face sheets of the composite sandwich structure. These additional layers, or doublers, provide increased stiffness and bearing strength to the structural interface. Generally, to provide the necessary structural integrity, both face sheets are reinforced with doublers. The additional layers increase the weight of the composite structure, thus reducing the specific strength and stiffness benefits provided by the composite sandwich structure. Therefore, only the region surrounding the structural interface is "doubled", allowing the rest of the composite structure to maintain its high strength-to-weight and stiffness-to-weight ratios.

In the case of large tubular composite structures, as are used for various components of space launch vehicles, doublers may be applied in one or more ways. For example, the doublers may be co-cured on the outside of composite face sheets, which requires the doublers be applied during the initial composite structure "lay-up." As will be appreciated, tubular composite structures are generally formed or laid-up on a mandrel that is removed after the structure is cured. In the case of tubular composite sandwich structures, adding doublers during lay-up requires a stepped mandrel having a varied diameter along its length. The stepped mandrel allows a doubling layer to be wound about the mandrel and then the normal face sheet layer wound on top of the doubling layer. As will be appreciated, if the double layer on the inside surface of the tubular structure is in any position other than the end of the mandrel, or if two doubling layers are utilized along the length of the mandrel, the mandrel cannot slide out of the composite sandwich structure upon curing. In this regard, a collapsible mandrel must be used. However, collapsible mandrels increase the cost, weight, and internal structure required of the mandrel, creating difficulties in maintaining mandrel stiffness and tolerances and further creating difficulties in the machinery utilized to apply the materials to the mandrel.

A second method for adding doublers to a section of a tubular composite sandwich structure involves post-bonding the doublers onto a pre-cured structure's face sheets. This allows a mandrel to be removed from a tubular composite structure prior to application of the doublers. However, adding the doublers, especially to the inside surface of a tubular structure, requires extensive tooling and costs. Further, care must be taken to assure the secondary bonding of the doublers to the face sheets provides good mechanical conformance. As will be appreciated, if the doublers do not properly adhere to the surface of the pre-cured face sheets such that, for example, internal voids exist, the entire composite sandwich structure may be irreparably damaged.

Finally, another method for providing a structural interface for a composite sandwich structure is to pan down the ends of the composite sandwich structure such that it transitions from a sandwich construction having two face sheets and an internal core to a monocoque construction where there is no core and the face sheets are now in direct contact. However, this eliminates many of the benefits of utilizing a composite sandwich structure, e.g., I-beam behavior and increased moment of inertia. Further, monocoque transition requires additional tooling and fabrication steps.

All of the above noted methods for providing doublers to stiffen a section of a tubular composite sandwich structure require substantial tooling and manufacturing steps, increasing the cost of the composite structure. Further, each of the above noted methods changes the external geometry of the composite structure (i.e., the spatial envelope within which the structure is contained defined by its exposed surfaces, which may define interior or exterior walls of an aerospace structure) relative to an un-reinforced geometry, which may be problematic in space launch vehicles.

SUMMARY OF THE INVENTION

It is therefore an objective of the present invention to provide an integrally reinforced section in a composite sandwich structure for use as a structural interface.

It is a further objective of the present invention to provide a process to produce an enhanced structural interface in a composite sandwich structure that does not require the use of specialized mandrels or tooling in the lay-up process.

It is a yet further objective of the present invention to provide an enhanced structural interface in a section of composite sandwich structure without altering the exterior dimensions of that composite structure It is a yet further objective of the present invention to provide a method for allowing selective alteration of the structural properties of a composite sandwich structure for a given exterior geometry limitation.

One or more of the above-noted objectives, as well as additional advantages, are provided by the present invention, which includes a composite sandwich structure having a first face sheet, a second face sheet, and a core sandwiched between the face sheets. More particularly, for a given external geometry, reinforcement of a section of interest is achieved by varying the proportions of the thicknesses of the structural layers. For example, the composite structure may contain at least first and second sections having equal cross-sectional thicknesses measured from the outside surfaces of each face sheet while the relative proportions of the core relative to at least one of the face sheets vary between the first and second sections. As will be appreciated, by varying the relative proportions of the face sheet(s) and core, a composite structure having varying mechanical properties between the first and second sections may be produced while maintaining a predetermined outside profile. Particularly, the relative proportions of the first and/or second face sheet and core may be varied to produce a section within the composite structure that is structurally enhanced (i.e., integrally reinforced) in comparison to other sections of the composite structure. This structurally enhanced section may then be utilized as, for example, a structural interface or joint for attaching the composite structure to other structures.

According to a first aspect of the present invention, a structure for use as a portion of sidewall of space launch vehicle is provided that includes a first face sheet, a second face sheet, and a core sandwiched between the inside surfaces of the first and second face sheets. This core has at least first and second thicknesses at first and second positions along the length of the structure. While the thickness of the core changes between the first and second positions, the distance between the outside surfaces of the first and second face sheets remains substantially equal at the first and second positions. As will be appreciated, in order to maintain the substantially equal distance between the outside surfaces of the face sheets at the first and second positions, the thickness of the first and/or second face sheet generally changes in proportion to the change in the core thickness.

Various refinements exist of the features noted in relation to the subject first aspect of the present invention. Further features may also be incorporated in the subject first aspect of the present invention as well. These refinements and additional features may exist individually or in any combination. For instance, the shape of the composite structure and the locations of the first and second thicknesses of the core may each be varied. In the case of the shape of the structure, a tubular structure may be particularly apt for use as a sidewall in the space launch vehicle. Alternatively, separate curved or flat panels may also be utilized to form the launch vehicle's sidewall. In the case of the core thicknesses, the first and second core thicknesses may be uniform, for example, across the entire width (i.e., about the circumference in a tubular structure) of the composite structure in first and second positions along the length of the structure. Alternatively, the first and second core thicknesses may only extend across a portion of the structure or be formed around regions where altered structural properties of the composite structure are desired.

The face sheets may be any material that provides the structural, thermal, and other properties desired for the sidewall of the launch vehicle. Preferably, at least one of the face sheets has a first thickness in a first position and a second different thickness in a second location to correspond with the first and second core thicknesses. This change in face sheet thickness allows the distance between the outside surfaces of the first and second face sheets to be equal in the first and second positions along the length of the structure without internal gaps or other accommodations in relation to the varying core thickness. As will be appreciated, an increased thickness section of either or both face sheets will generally stiffen the structure and provide greater bearing strength than thinner sections of the face sheets. Therefore, a preferred embodiment for structural interfaces utilizes a reduced core thickness and a corresponding increase in thickness for one, and more preferably both, face sheet(s), providing a section in the composite structure having enhanced stiffness and bearing strength.

In a preferred embodiment, the face sheets are made from one or more layers of a fiber reinforced material. That is, the face sheets may be made of a material that utilizes strong stiff fibers encapsulated in a softer, more ductile resin matrix. The face sheets may be formed from a plurality of layers of carbon fiber reinforced plastic, glass fiber reinforced plastic, aromatic polyamide fiber (such as Kevlar® made by DuPont) reinforced plastic, or any other appropriate material. In this regard, the thickness of each face sheet may be varied by varying the number of fiber reinforced material layers used to form that face sheet. For example, additional fiber reinforced material layers may be added to or removed from one or both face sheets in positions where there is a corresponding reduction, or increase, in core thickness. More particularly, these "augmentation" layers may be applied to or removed from what becomes the inside surface of the face sheets (i.e., the side in contact with the core). By applying and removing the augmentation layers to the inside surfaces of the face sheet(s), the relative proportions of the face sheets and core may be altered without altering the outside dimension of the composite structure.

The structure's core may be any material that provides, in conjunction with the face sheets, the structural, thermal and other properties desired for the sidewall of the launch vehicle. A non-inclusive list of appropriate materials include any light-weight material such as metallic (e.g. aluminum) or non-metallic (e.g. Nomex manufactured by Créations Guillemot Inc. of Beauport, Québec, Canada) honeycomb, structural foam, balsa wood, a metal or metal alloy in an appropriate form, a metal matrix composite in an appropriate form (e.g., a hybrid of a metal/metal alloy and one or more non-metallic materials), or any other appropriate core material and in any appropriate form, including solid materials. As noted, the core has first and second thicknesses in first and second longitudinal positions along the length of the composite structure. In this regard, the core may contain one or more "steps" on one or both of its surfaces. That is, one side may remain substantially planer between the first and second positions while the other side of the core varies the core's thickness between the first and second steps. As will be appreciated, in this situation, the face sheet on the varying side of the core may correspondingly vary in thickness between the first and second positions while the face sheet on the planer side of the core may remain a constant thickness between the first and second positions.

The structural properties of the core may also vary along the length of the structure. For example, core properties at the first longitudinal position may be different than core properties at the second longitudinal position. In one preferred embodiment, the density between the two positions varies with structural requirements. For example, to increase bearing and compressive strength at a reduced thickness core position for use in a structural interface, a core having an increased density may be utilized. The change in density from the first and second position may require using a material having varying properties (i.e., a denser portion along its length) or using two separate materials, such as a solid aluminum block (denser) in a reduced core thickness position having high bearing and compressive strength requirements, and an aluminum honeycomb in core positions having greater thickness and lower bearing and compressive strength requirements. Regardless of the core materials utilized, it is preferred that the first and second sections of these materials are somehow "knitted" together, (i.e., glued, welded, etc.) to increase the structural properties of the resulting structure.

In the case of a tubular structure used in the sidewall of a space launch vehicle, one or more integrally reinforced sections may be utilized. Particularly, the ends of such a structure may be integrally reinforced to provide a structurally sound joint to attach the structure to other components of the launch vehicle. However, it will be appreciated that one or more integrally reinforced sections may be utilized along the length of sidewall.

According to a second aspect of the present invention, a process for making a structure for use as a portion of a space launch vehicle's sidewall is provided. Steps of the process include applying a first face sheet to the outside surface of a mandrel; covering the resulting outside surface of the first face sheet with a core layer having at least a first and second thickness at first and second positions along the length of the mandrel; applying a second face sheet to the resulting outside surface of the core layer; curing the resultant structure and removing the mandrel. Further, at least one of the face sheets will be applied having at least first and second thicknesses such that the combined thickness of face sheets and core (i.e., relative proportions) at each the first and second positions is equal.

Various refinements exist of the features noted in relation to the subject second aspect of the present invention. Further features may also be incorporated in the subject second aspect of the present invention as well. These refinements and additional features may exist individually or in any combination. For instance, a tubular mandrel having a uniform outer surface such as a cylinder may be utilized to form the structure; the mandrel may taper from its first end to its second end; the mandrel may contain steps on its surface to provide for variations in the face sheet formed thereon, etc. The methods of application of the face sheets and/or the core may also vary. For example, the face sheets may comprise strands or filaments that are machine placed (e.g., wound or fiber placed) onto the mandrel, material that is applied by hand, or a combination of the two.

The first and second applying steps, in a preferred embodiment of the present invention, include applying a plurality of fiber reinforced material layers to the outside surface of the mandrel and core, respectively. These fiber reinforced material layers may comprise broad goods (sheets) or filaments. Further these layers will contain a resin that forms the face sheet into a solid laminate structure upon curing. This resin may be a wet resin applied to the fiber reinforced materials after or during placement, or, more preferably, the fiber reinforced materials will be pre-impregnated with the resin material prior to application. As will be appreciated, fiber reinforced materials generally contain an "axis" along which the fibers are oriented. In each applying step, the various fiber reinforced material layers may be applied such that the axes between the layers are orthogonal to produce desired mechanical, thermal and/or other desired properties.

In each of the first and second applying steps, where a plurality of fiber reinforced material layers are utilized, the number of layers may be varied between first and second positions of the face sheet(s) so as to change the thickness of the face sheet in these first and second positions. That is, at least one of the face sheets may have extra fiber reinforced material layers "wound" onto the mandrel or core (or otherwise applied) in positions corresponding with a reduction in thickness of the core along the length of the mandrel. By inserting extra layers onto what becomes the inside surfaces of the face sheets during lay-up, the overall thickness of the composite structure may remain equal in the first and second positions corresponding with the first and second core thicknesses without changing the outside dimensions of the structure.

The step of curing the composite structure generally entails consolidating the composite structure and causing the resin material to harden/set and or dry. Consolidation may utilize any method to provide a compressive force to the face sheet layers such that there is good conformance between the layers upon curing. A non-inclusive list of consolidating method includes, vacuum bagging, pressurized chambers, compaction rollers and squeegees (e.g., for wet resin applications). Curing is preferably done in a autoclave that heats the structure in a pressure chamber having an elevated pressure. Preferably, the composite structure is both vacuum bagged and cured in a pressurized autoclave to provide increased consolidating force for the multi-layered face sheets. The exact temperature and pressure settings as well as the duration of the curing process varies in relation to the materials utilized to form the composite structure.

According to a third aspect of the present invention, a method for designing a multi-layered structure having at least one reinforced portion is provided. The method includes the step of determining a spatial envelope for the structure. That is, determining at least one constraining factor, such as a maximum allowable thickness or length for the multi-layered structure. Next, a portion of the structure is identified for reinforcement. The portion identified for reinforcement may be so identified for any of a plurality of reasons, typically, reinforcement is desired due to the forces that are expected to act upon the structure during its intended use. Based on the constraints of the spatial envelope, at least one of the material properties and/or the dimensions of one or more layers of the multi-layered structure are altered to provide the desired reinforcement at the identified portion. That is the properties/dimensions of the identified portion's layers are altered in comparison with, for example, the layers of non-reinforced portions of the structure. Finally, the reinforcement of the desired portion is designed such that it does not create an external irregularity on a surface of the multi-layered structure.

Various refinements exist of the features noted in relation to the subject third aspect of the present invention. These refinements and additional features may exist individually or in any combination. For example, the step of identifying a portion of the structure for reinforcement may comprise determining one or more required structural properties of the portion to be reinforced, such as tensile strength, compressive strength, bearing strength, stiffness, or any other desired property (.e.g., thermal properties, etc). As will be appreciated, the spatial envelope may also be used to determine the required structural properties of the portion to be reinforced. For example, a planer multi-layered structure having maximum allowable thickness of N (i.e., spatial envelope) and a point load of X may require reinforcement such that the load does not deflect the structure beyond a predetermined maximum value.

As will be appreciated, the method of designing the multilayered structure with one or more reinforced portions requires that the material properties of the various layers be known in order to determine the structure's overall properties. Once the general properties of the structure are known, a material property and/or dimension of one or more of the structure's multiple layers may be altered to reinforce the identified portion. In particular, the material property/dimension of one or more of the layers may be altered in comparison to other (i.e., non-reinforced) portions of the multi-layered structure to produce the desired reinforcement. In a preferred embodiment of the subject aspect of the present invention, one or more layers of the structure are increased in thickness while one or more different layers of the structure are decreased in thickness to provide the desired reinforcement of the identified portion. For example, in the case of a composite structure having first and second face sheets with a core material sandwiched in-between, increasing the thickness of one or both face sheets while correspondingly reducing the thickness of the core may produce a portion of the structure having enhanced stiffness. Further, if the increase of the face sheet's thickness is increased on its inside surface, the structurally enhanced portion will be free of any exterior irregularity associated with the reinforcement. Alternatively, a change in material properties, such as an increased density core or stiffer face sheets at the reinforced portion may be utilized to provide the desired reinforcement while the structure's external surface remains free of any exterior irregularity. Once the materials/dimensions of each layer and the reinforced portion are determined, the structure may be formed by any of a number of methods known to those skilled in the art.

According to a fourth aspect of the present invention a composite structure having variable structural properties is provided. The composite structure comprises a first outermost layer, a second innermost layer and a core layer between the first and second layers creating what is often referred to as a composite sandwich structure. The outermost and innermost surfaces of the outermost and innermost layers, respectively, define the overall thickness of the composite structure at any position on the structure. The composite structure has a variation between a first set of structural properties at a first portion of the structure and a second set of structural properties at a second portion of the structure. This variation in structural properties is at least partially dependent on the relative proportions of the first layer, second layer and core layer at the first and second portions while remaining independent of the composite structure's overall thickness, which may be the same at the first and second portions.

Various refinements exist of the features noted in relation to the subject third aspect of the present invention. These refinements and additional features may exist individually or in any combination. For example, the first and second layers may be made of any materials such as wood or metal. However, in a preferred embodiment the first and second layers comprise a plurality of fiber reinforced material layers such as carbon reinforced plastics, glass fibers, etc.

As noted, the variation in the structural properties of the composite structure between the first and second portions is at least partially related to the relative proportions of the thicknesses of the first layer, second layer, and core in these portions. For example, in a preferred embodiment, the thickness of one of the first and second layers may be increased in relation to the thickness of the core, which may itself be decreased in thickness such that the overall thickness of the structure remains unchanged. As will be appreciated, depending on the material properties (e.g., stiffness, density, etc) of the layers, this may result in a portion of the composite structure having enhanced structural properties in comparison to another portion of the composite structure that has different relative proportions and/or material properties of the layers. In this regard, a composite structure may have an equal overall thickness at a first and second portion while one of these portions provides enhanced or reduced structural properties in comparison to the other portion. For example, the compressive strength or stiffness of a particular portion may be increased or decreased to provide desired structural properties.

The materials utilized to form the layers may also be altered between the first and second portions to produce the variation between the first and second sets of structural properties. For example, where the first and second layer comprise a plurality of fiber reinforced material layers, a first portion may utilize a plurality of glass fibers layer while the second portion may utilize a mixture of glass and stiffer carbon fiber layers. In this regard the second portion may have an increased stiffness in comparison with the first portion. Alternatively, differing core materials may be utilized between the first and second positions having, for example differing densities to produce the variation between the first and second sets of structural properties.

DETAILED DESCRIPTION

The present invention will now be described in relation to the accompanying drawings, which at least assist in illustrating the various pertinent features thereof. By way of initial overview, the present invention relates to an integrally reinforced composite sandwich structure and a method for making the same. One embodiment of such a structure generally contains a first face sheet, a stepped core having two or more thicknesses at two or more "step" locations, and a second face sheet. More particularly, the first, second, or both face sheets also vary in thickness in an inverse relationship with the stepped core to produce a composite sandwich structure that has a constant outside profile between the two "step" locations. That is, the face sheets and the core make up varying relative proportions of the structure's overall thickness at the two locations while the structure maintains a constant outside profile. Accordingly the composite sandwich structure has differing structural properties at the two locations that relate to the varying relative proportions of the face sheets and core. The integral reinforcement of a composite structure will now be described, after which a method for manufacturing the same will be described.

Figure 1:
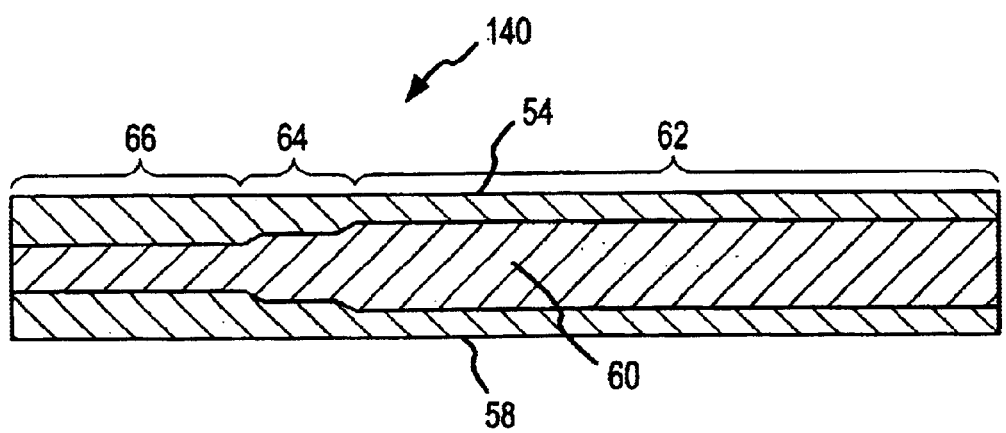
FIG. 1 shows a cross sectional view of a portion of an integrally reinforced composite structure.

FIG. 1 shows a cross sectional view of one embodiment of a portion of an integrally reinforced composite sandwich structure 140. As shown, the structure 140 contains a first face sheet 54, a second face sheet 58 and an internal stepped core 60. The face sheets 54, 58 are formed from carbon fiber reinforced plastic, glass fiber reinforced plastic, aromatic polyamide fiber (such as Kevlar® made by DuPont) reinforced plastic, or any other appropriate material. Additionally, the internal stepped core 60 is a light-weight material such as metallic (e.g. aluminum) or non-metallic (e.g. Nomex manufactured by Créations Guillemot Inc. of Beauport, Québec, Canada) honeycomb, structural foam, balsa wood, a metal or metal alloy in an appropriate form, a metal matrix composite in an appropriate form (e.g., a hybrid of a metal/metal alloy and one or more non-metallic materials), or any other appropriate core material and in any appropriate form, including solid materials, for increasing compressive and bearing strengths, as will be discussed herein.

Figure 2:
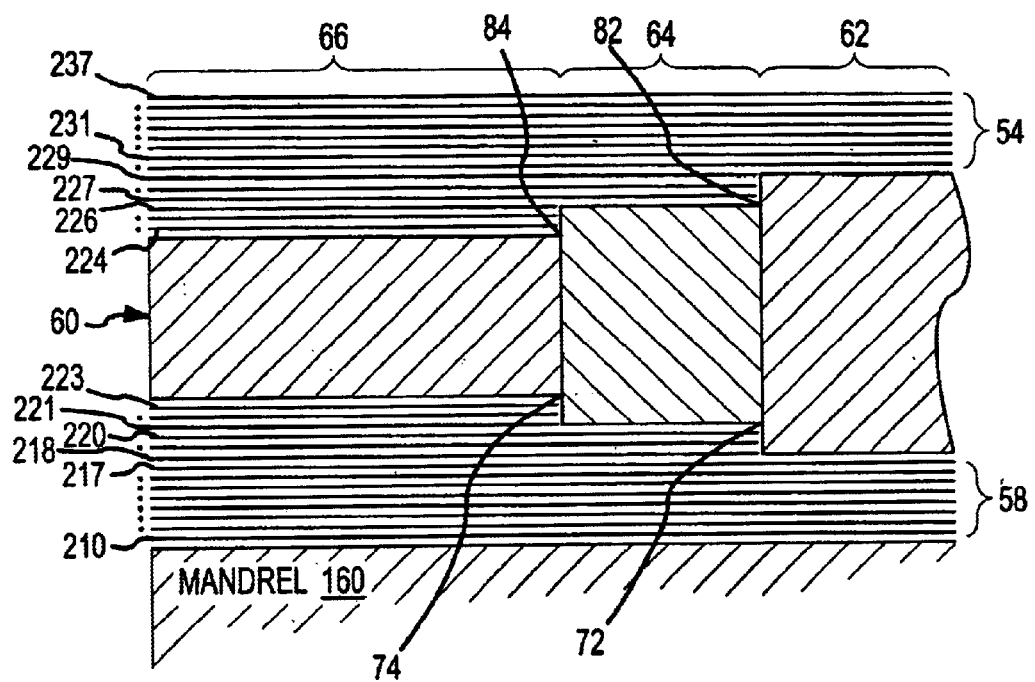
FIG. 2 shows a close up view of the integrally reinforced structure of FIG. 1.

Referring to FIG. 2, a more detailed disposition of the composite sandwich structure 140 of FIG. 1 is shown. The face sheets 54 and 58 each comprise a plurality of fiber reinforced material layers, or plies, 224–237 and 210–223, respectively. These plies 224–237 and 210–223 are formed of a plurality of reinforcing and/or supporting preimpregnated fiber layers. Preimpregnated fiber or "prepregs" are layers of fiber, fiber tape or woven fabric that are preimpregnated with a resin. However, those skilled in the art will appreciate that non-impregnated fibers and a wet resin may also be utilized. Upon curing, the resin forms a solid matrix material that transmits forces to the fibers and provides ductility and toughness while the fibers carry most of the applied force. The fibers may be in any conventional form, such as unidirectional, woven fabric, etc. When unidirectional tape is used, each ply is formed of a plurality of parallel oriented preimpregnated tows that may comprise, for example 6,000 or 12,000 fibers.

Figure 3:
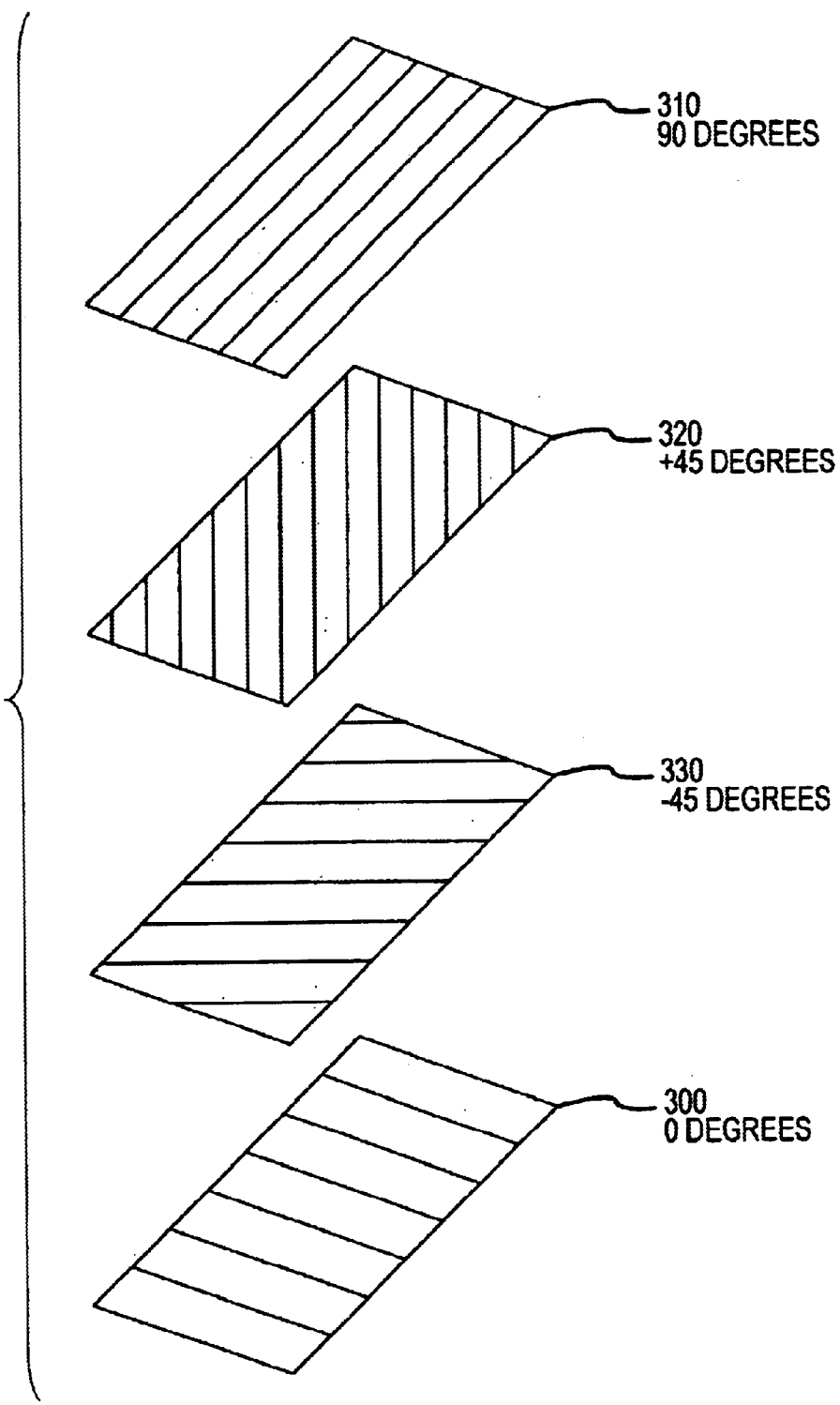
FIG. 3 shows a possible orientation of composite fiber plies.

The orientation of the tows of each ply is based on the desired directional strength and/or desired thermal properties of the resultant fiber reinforced resin composite. As is conventional, some plies lie parallel to a predetermined direction, which is usually the direction of the major force likely to be applied to the resultant laminate (i.e., cured) structure. Plies whose tows lie in this direction are commonly referred to as 0.degree. plies 300. (See FIG. 3) Other plies lie at an angle to the 0.degree. plies 300. That is, the axis of the tows of some plies lie orthogonal to the tow direction of the 0.degree. plies 300. These plies are commonly referred to as 90.degree. plies 310. Plies whose tows lie at some other angle with respect to the direction of the tows of the 0.degree. plies 300 are referred to as + and − plies. Most commonly, the tows of these plies form +45.degree. 320 and −45.degree. 330 angles with respect to the direction of the tows of the 0.degree. plies 300. The number of 0.degree. 300, 90.degree. 310, and + and − plies and how they are interleaved is, of course, dependent upon the desired qualities for the resultant composite structure. What is important is that the plies may be oriented to produce desired structural and thermal qualities for the composite structure.

Figure 4:
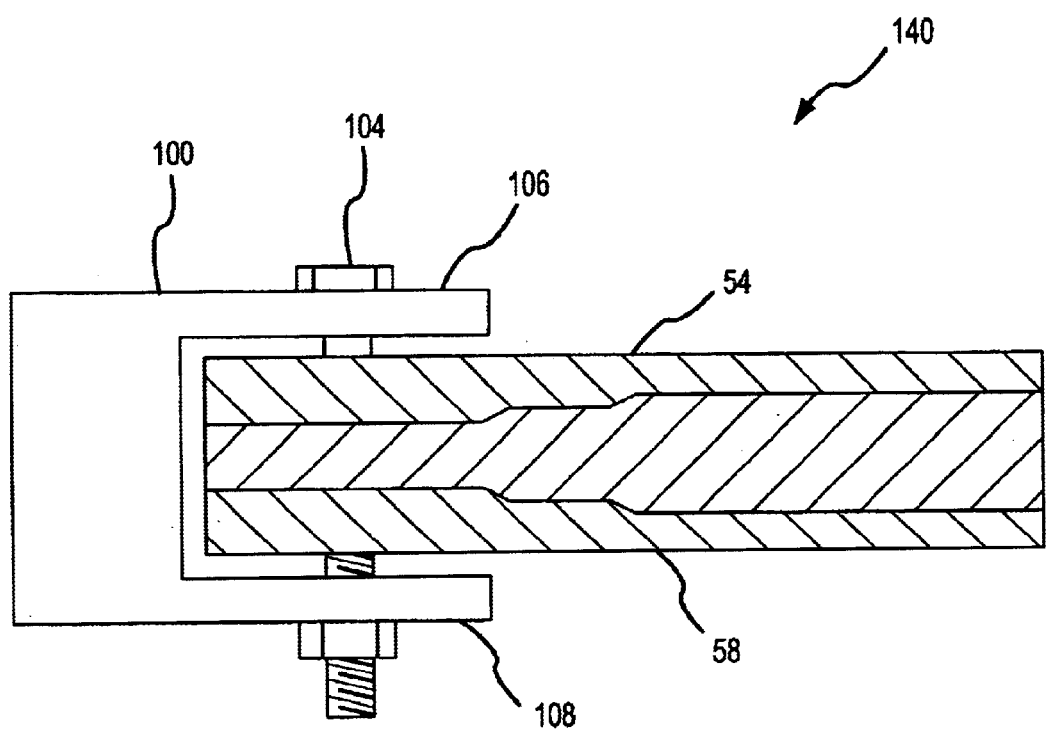
FIG. 4 shows the composite structure of FIG. 1 interfacing with a socket joint.

Utilizing a composite sandwich construction provides a composite structure 140 (i.e., specific strength) ratios. However, as noted above, it is desirable to reinforce those sandwich structures at points of concentrated loading such as structural interfaces. For example, FIG. 4 shows the composite structure 140 of FIG. 1 interfacing with a U-shaped socket joint 100. The socket joint 100 contains a bolt 104 that passes through a first socket joint flange 106, the composite structure 140 and a second socket joint flange 108. Upon tightening the bolt 104, a compressive load may be made on the outside surfaces of the composite structure 140. Additionally, structural loads (i.e., compressive, tensile, bending moments etc.) may be applied to the composite structure 140 through this structural interface. In order to support the interface loads and spread the force of these loads over a large surface of the composite structure 140 (perpendicular to the plane of the paper) the interfacing section of the composite structure 140 must be reinforced.

Referring again to FIG. 1, it is noted that each face sheet 54, 58 as well as the core 60 contain first, second, and third sections 62, 64, and 66 which have first, second and third differing thicknesses while the outside profile of the composite structure 140 remains unchanged. As will be appreciated, the face sheets 54, 58 each contain two sections 64, 66 that are thicker in relation to the section 60. These thickened face sheet sections 64, 66 contain various augmentation plies 218–223 and 224–229 applied to their inside surfaces (See FIG. 2). These augmentation plies 218–223 and 224–229 are generally referred to as "doublers." The augmented sections 64 and 66 form face sheet sections having greater bearing strength, compressive strength and stiffness in comparison with the non-augmented face sheet section 62.

As shown in FIG. 2, the core 60 contains two steps 72, 74 on its bottom surface and two steps 82, 84 on its top surface. These steps 72, 74 and 82, 84 reduce the thickness of the core in an inverse relationship to the augmented sections 64, 66 of each face sheet 54, 58. Moreover, the internally augmented sections of the face sheets in connection with the inversely reduced stepped core 60 produce a composite sandwich section 66 that is stiffer and has greater bearing and compressive properties than the other composite sandwich sections 62, 64. This produces a structurally enhanced composite sandwich structure section 66 without altering the outside dimensions of the composite structure 50. That is, the outside surfaces of each face sheet 54 and 58 remain a constant distance apart notwithstanding the change of the relative dimensions of the thickness of the face sheets 54 and 58 and the stepped core 60. This provides a composite sandwich structure 140 that is internally or "integrally" reinforced to produce sections having different structural properties.

Integral reinforcement allows the stiffness and bearing strength of the composite structure 140 to be adjusted (i.e., by adding additional doublers to the face sheet inside surfaces) without changing the structure's 140 outside dimensions, allowing for alteration of the composite structure's properties (i.e., post-design changes) without adjusting interfacing hardware, structures or tooling. This is especially important in complex systems such as space launch vehicles where altering one component may require redesigning and/or altering a plurality of secondary components. Further, the internal augmentation allows structural enhancement to a composite sandwich structure 140 while maintaining a uniform outer surface, which may be desirable for aerodynamic purposes or to facilitate mounting ancillary features.

Referring to FIGS. 4 and 2, the section 66 through which the bolt 100 passes contains the augmentation plies 218–223 and 224–229 and the correspondingly reduced stepped core section 60. The relative proportions of the face sheets 54, 58 and core 60 provide the required structural properties for interfacing with the socket joint 100. The second section 64 provides an intermediate "step" 72 and 82 (See FIG. 2) between the section 66 containing the most plies and the section 62 containing the least. In this regard, the intermediate steps 72 and 82 of section 64 help prevent stress concentrations from forming that may result from a single large increase in plies from one section to the next. As will be appreciated, a plurality of intermediate steps may be used or a tapered core may be utilized along with plies of gradually increasing lengths to prevent stress concentrations.

Figure 5:
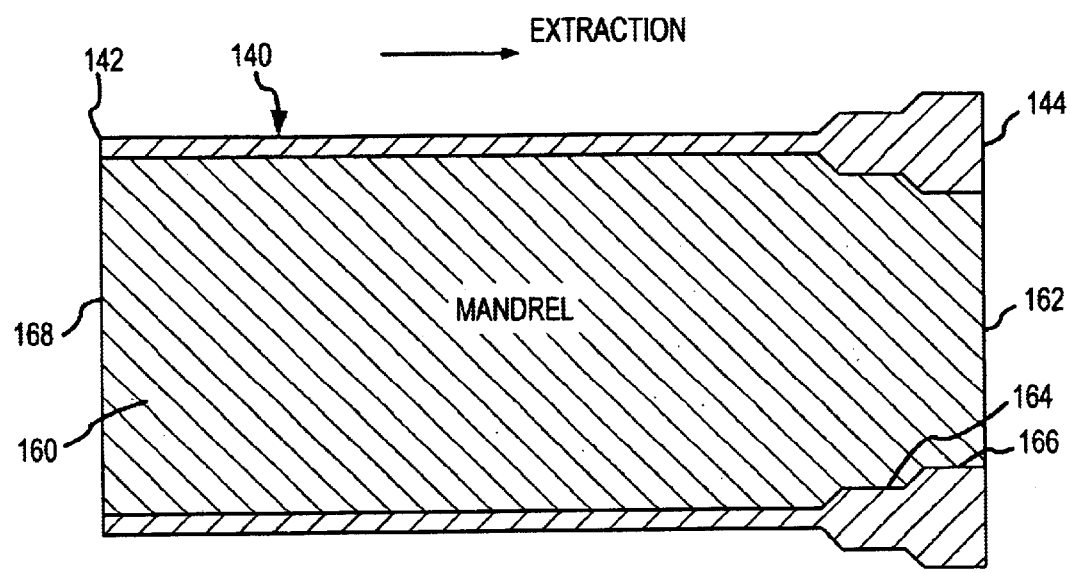
FIG. 5 shows a cross sectional view of an integrally reinforced composite structure laid up on a mandrel.
Figure 6:
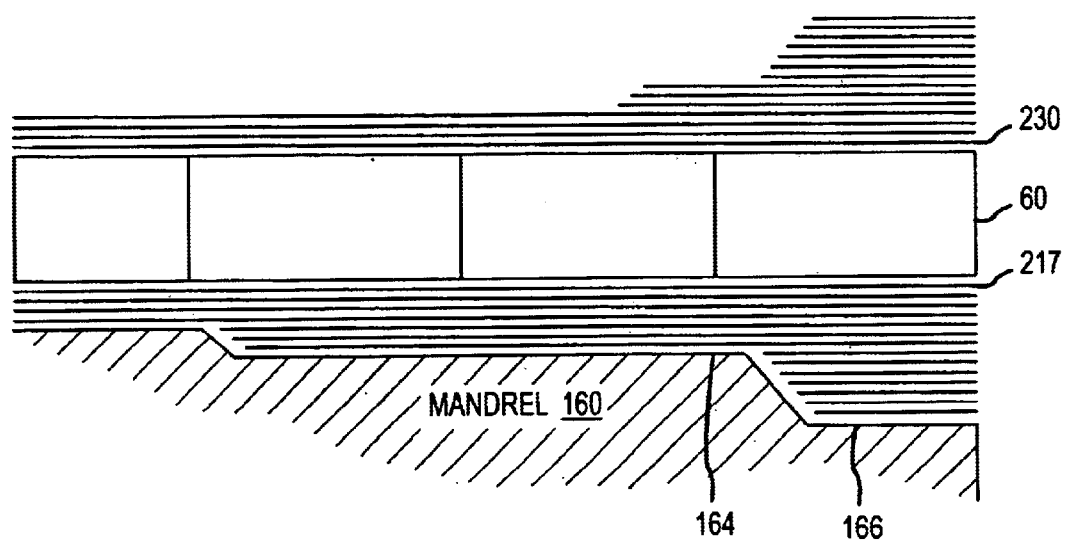
FIG. 6 shows a close up view of an externally reinforced end of the structure of FIG. 5.

Referring to FIGS. 2, 5 and 6, a tubular composite sandwich structure having structurally reinforced sections is described. This tubular composite structure 140 contains the integrally reinforced section described above. Though described in conjunction with a tubular composite sandwich structure for use in space launch vehicle, it is expressly understood that the present invention may be utilized with other composite sandwich structures.

Generally, tubular composite structures are formed on a mandrel or "tool" (See FIG. 5). In this regard, one or more plies of a fiber reinforced material are applied to the outside surfaces of a mandrel and cured. The fiber reinforced material plies may be individual fibers, woven fabrics, tows etc., and may be preimpregnated or wet fibers. The fiber reinforced material plies may be hand laid upon the surface of the mandrel or, more preferably, wound onto the mandrel. For example, filament winding may be utilized to place the fibers that make up each ply. Filament winding is a highly automated process utilizing a continuous tow spool (prepreg or wet) of several fiber tows that are wound on a mandrel by a winding machine. For tubular structures, the mandrel is generally a steel or aluminum cylinder with a carefully machined outer diameter. A release agent is applied to the mandrel's surface before winding which enables the composite structure to be removed after curing. The mandrel is then placed under tension in the winding machine which rotates the mandrel while a moving carriage supplies the fiber tows. Typically, these machines are numerically controlled for high repeatability and precision. Regardless of the method utilized to lay-up the various plies, once the plies are laid, the composite structure is subject to some sort of consolidating force and a curing method. The consolidating force provides force to join the plies together and minimize voids in the cured composite structure 140. Various methods of consolidation include shrink wrapping the pre-cured structure 140 and mandrel, vacuum bagging the pre-cured structure 140 and mandrel and utilizing a pressure chamber pressurized beyond atmospheric pressure. Curing may be done utilizing heat, UV and/or laser. However, as will be appreciated, most large composite structures utilize a vacuum bag to provide the consolidating force and an autoclave to apply heat and pressure while curing the structure.

FIG. 5 shows a cross-sectional view of a cylindrical composite sandwich structure 140 utilized for a portion of a sidewall of a space launch vehicle. As shown, the structure 140 is formed on a generally cylindrical mandrel 160. FIGS. 2 and 6 show cross-sectional profiles of each end 142 and 144 of the cylindrical composite sandwich structure 140. FIG. 2 is the same Figure used in the discussion above and contains an integrally reinforced section 66. As shown in FIG. 5, the right end 162 of the mandrel 160 contains two steps 164 and 166 that each successively reduced the mandrel's diameter. In contrast, the left end 168 of the mandrel 160 maintains a uniform diameter.

FIG. 6 shows the right end 162 of the composite structure on the mandrel 160. As shown, this section of the composite structure 140 utilizes external augmentation layers and a non-stepped uniform core 60. The use of the internally augmented reinforced section on the left end 168 of the composite structure 140 allows the composite structure 140 to slide off the mandrel 160 after curing. Alternatively, both ends 162, 168 of the composite structure 140 may utilize internal augmentation layers to provide a stiffened section for structural interconnections. In this regard, a mandrel having a uniform diameter from the left end 168 to the right end 162 may be utilized.

Figure 7:
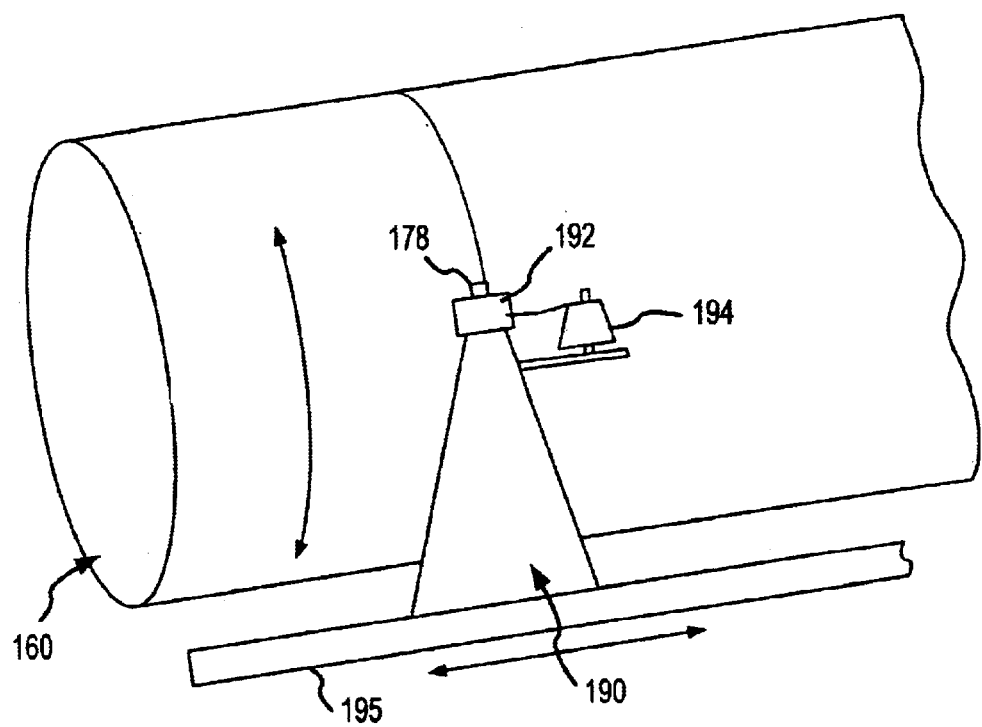
FIG. 7 shows a fiber placement machine for winding a composite filament tape onto a mandrel.

FIG. 7 shows the lay-up of the fiber reinforced material layers to the outside surface of the mandrel 160. As shown, a fiber placement apparatus 190 is utilized. Similar to a filament winding machine, the fiber placement apparatus 190 is utilized to place a preimpregnated fiber tape/tow on the outside surface of the mandrel 160 to form the various plies that make up the resultant composite structure 140. The fiber tape/tow is preferably a carbon fiber reinforced plastic (CFRP). The fiber placement apparatus 190 moves along the longitudinal length of the mandrel 160 on a carriage 195 while the mandrel 160 is rotated. The fiber placement apparatus 190 draws the fiber tape/tow from a spool 194 interconnected to a placement head 192. As will be appreciated by those skilled in the art, preimpregnated CFRP tape/tow is normally stored in a frozen or refrigerated condition to extend the shelf life of the resin matrix prior to curing. To ensure that the tape/tow adheres to the surface of the mandrel and/or previous plies, the placement head 192 contains a heating element 193 that preheats the tape/tow prior to placement such that it is "tackified". That is, the resin holding the fibers together is softened (i.e., thawed) to act as a glue that holds the composite structure 140 together prior to curing.

Figure 8:
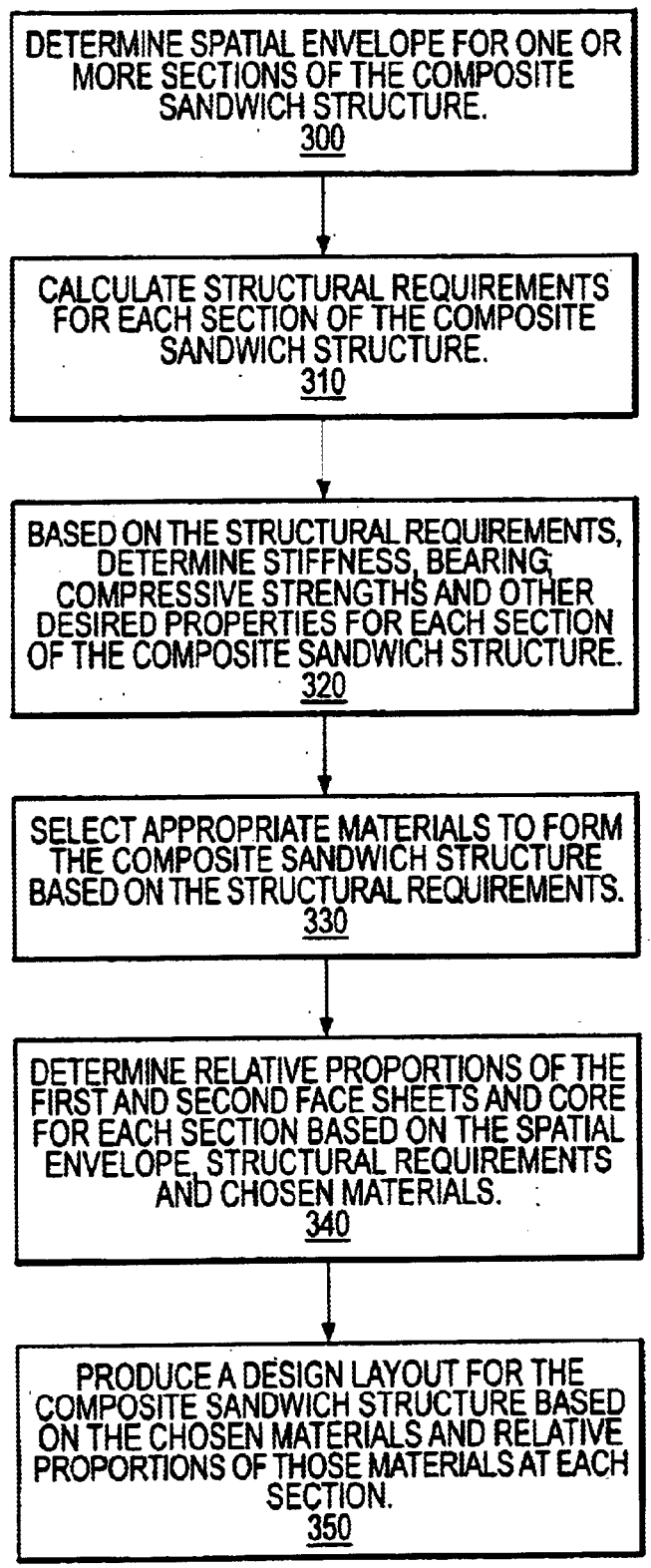
FIG. 8 shows a flow chart illustrating one embodiment of a design process for producing an integrally reinforced composite structure.

FIG. 8 is a flowchart illustrating one implementation of a design process utilized for producing a composite sandwich structure having at least one integrally reinforced section along its length. Initially, the spatial envelope for the composite structure 140 is determined (300). That is, a physical constraint such as an allowable thickness of the composite structure at one or more sections is determined. These constraints may be in relation to one or more interfacing structures or forces to be applied to the composite structure. For example, in case of a tubular composite sandwich structure for use as a portion of the sidewall of the space launch vehicle, the end of the composite structure generally interfaces with a metal socket joint (See FIG. 4). In this regard, the width of the socket joint mandates the maximum thickness of the composite sandwich structure 140 at the joint. In addition, determination (300) of the spatial envelope may further entail physical constraints in the lay-up/formation of the composite sandwich structure 140 such as mandrel size, type of mandrel, and/or desired interfacing characteristics, such as a uniform surface for mounting ancillary features, etc.

Once the spatial envelopes are determined (300) for the composite structure 140, the structural requirements for one or more sections of the composite structure 140 are calculated (310). As will be appreciated, this step of calculating (310) takes into account various loads applied to various sections of the composite structure 140. For example, a uniform compressive load may be applied over the entire composite structure 140 due to, for example, using the structural composite to interconnect a booster rocket and a payload. In addition, individual sections along the length of the composite structure 140 may be subject to additional individual loads, such as but not limited to, bending moments, compressive forces, tensile forces, etc. Further these forces may be applied-in-plane or out-of-plane with respect to the composite sandwich structure 140. Based on the calculation(s) (310), desired stiffness, bearing and compressive strengths are determined (320) for the various sections of the composite structure 140.

Based on the determination (320) of the required strengths of the various composite structure sections, appropriate materials are selected (330) to form the composite structure 140. For example, appropriate fiber reinforced materials are selected to form the face sheets and an appropriate spacer material is selected for the core. Once materials are selected (330), the relative proportions of the first and second face sheet and core are determined (340) for each section of the composite structure to provide the desired structural characteristics. For example, if a section requires additional stiffness, the core thickness may be reduced while one or both of the face sheets thicknesses is increased, thus, increasing that sections stiffness while maintaining a profile that is the same as the profile at other sections of the composite structure 140. Accordingly, based on the selection (320) of materials and determination (340) of the relative proportions of the face sheets and core, a design layout for the composite structure is produced (350).

Figure 9:
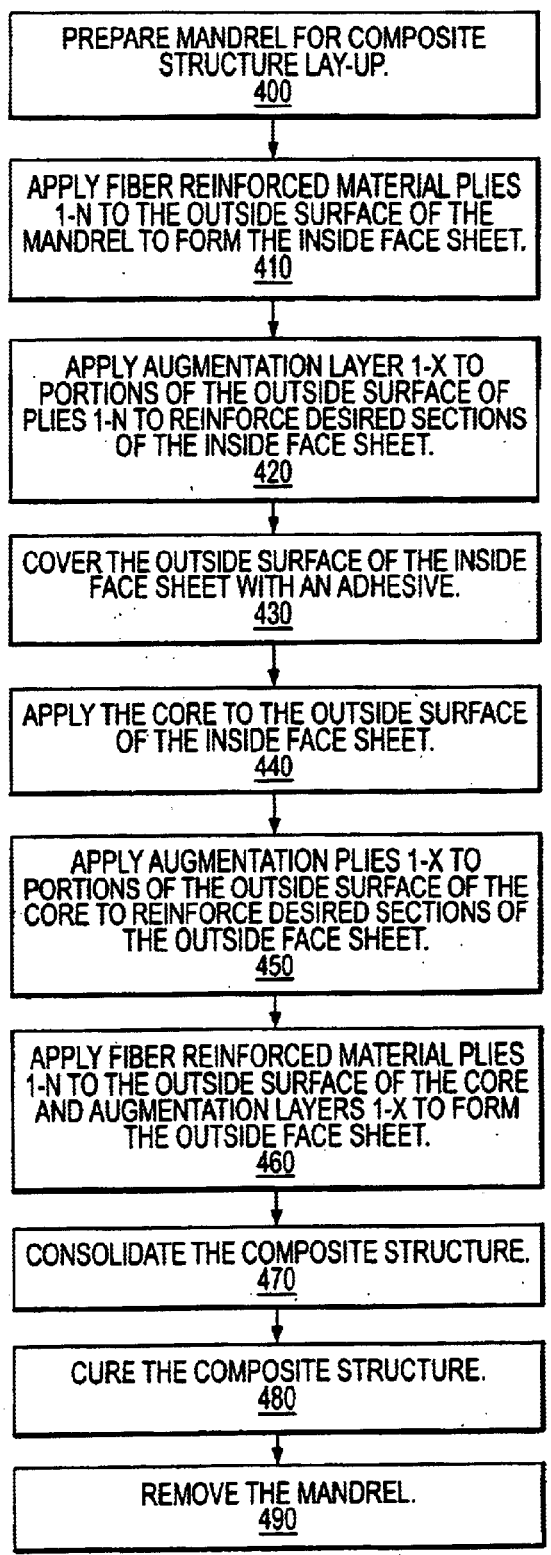
FIG. 9 shows a flow chart illustrating a process for producing a tubular composite structure having an integrally reinforced section.

FIG. 9 is a flowchart illustrating one implementation of a process for producing a tubular composite sandwich structure. Initially, a mandrel 160 (See FIGS. 2 and 5) is prepared (400) for the lay-up of the composite structure 140. Preparation may entail the sub-step of applying a release agent to the outside surface of the mandrel 160 such that the mandrel may be removed after curing. To form the inside face sheet 58, the inside ply 210 is applied (410) to the surface of the mandrel 160, after which successive plies 211–217 are applied (410) to the outside surface of the preceding ply. As noted above, the directions of the fibers of each ply may be oriented orthogonally in relation to the ply above and/or below it to achieve particular mechanical and/or thermal properties. In this regard, the fiber placement apparatus 190 may be operative to move along the longitudinal length of the mandrel 160 as the mandrel rotates to apply the ply with the desired angle of fiber orientation. Though the lay-up discussed herein refers to a particular number of fiber reinforced material plies, it will be appreciated that the number of these plies may be increased or decreased depending on desired/required mechanical and/or thermal properties. Plies 210–217 are applied (410) across the entire surface of the mandrel 160. To produce the integrally reinforced section (i.e., sections 64 and 66 of FIG. 2) augmentation plies are applied (420) to sections of the structure where reinforcement of the inside face sheet 58 is desired. As shown, three augmentation plies 218–220 are applied (420) to sections 64 and 66 on the outside surface of ply 217. Three additional augmentation plies 221–223 are then applied (420) on the outside surface of ply 220. These augmentation plies may be applied (420) utilizing the fiber placement apparatus 190 or manually applied (i.e., hand laid).

Once all the fiber reinforced material plies and augmentation plies that make up the inside face sheet 58 are applied (410 and 420) to the mandrel 160, an adhesive is applied to cover (430) the exposed surface of the inside face sheet 58. This adhesive is used to secure the core 60 to the mandrel 160 prior to application of the outside face sheet 54. Accordingly, the core 60 is applied (440) to the exposed surface of the face sheet 58. In the illustrated embodiment, a stepped core 60 is utilized that contains two inside steps 72, 74 that reduce the core's thickness a corresponding amount for each set of augmentation plies 218–220 and 221–223. This produces a core 60 that is in direct contact with the outside surface of the inside face sheet 58 across the length of the mandrel 160. As noted above, the core 60 may be any appropriate homogenous material, however, the core may also utilize different materials for different sections. For example, section 66 may utilize a denser material or even a solid material such as an aluminum block, to increase the bearing and compressive strength of section 66. Regardless of what material(s) is/are used for the core 60, sections 62, 64 and 66, it is preferred that the various core sections are somehow interconnected to increase the composite structure's post-curing strength and facilitate lay-up.

The core's outside surface also contains two steps 82 and 84 (See FIG. 2) such that the inside and outside surfaces of the core 60 are mirror images. However, it will be appreciated that only one core surface and its contacting face sheet may contain steps and still be within the scope of the invention. In reverse order of the application of the inside face sheet plies 210–223, the outside face sheet's plies 224–226 and 227–229 are applied (450) on the outside surface of core section 66 in areas where reinforcement for the outside face sheet 54 is desired. Plies 230–237 are then applied (460) to the outside surface of augmentation ply 229 and the outside surface of the core 60.

Once all of the outside face sheet plies are laid, the composite structure 140 is consolidated (470) by enclosing it in a vacuum bag, which is evacuated to reduce the pressure therein by approximately 1 bar. The entire composite structure 140 and mandrel is then placed in an autoclave where heat and pressure are applied to cure (480) the composite structure 140. After the composite structure 140 has cured (480) for a predetermined period, the structure 140 is removed from the autoclave and the mandrel is removed (490).

Those skilled in the art will now see that certain modifications can be made to the composite structure and method herein disclosed with respect to be illustrated embodiments without departing from the spirit of the instant invention. And while the invention has been described above with respect to the preferred embodiment for use as a sidewall for portion of space launch vehicle, it will be understood that the invention is adaptive to numerous rearrangements, modifications, and alterations that may be utilized for any composite structure and that these rearrangements, modifications, and alterations are intended to be within the scope of the appended claims.

What is claimed is:

1. A process for producing a tubular composite structure having at least one integrally reinforced section, said process comprising the steps of:

first applying a first face sheet onto an outside surface of a mandrel having a longitudinal axis;

covering an outside surface of said first face sheet with a core layer having a first core thickness at a first position relative to said longitudinal axis and a second core thickness, different than said first core thickness, at a second position relative to said longitudinal axis;

second applying a second face sheet to an outside surface of said core layer, wherein at least one of said first and second face sheets has a first sheet thickness at said first position and a second sheet thickness, different than said first sheet thickness, at said second position, and wherein said first face sheet, said core, and said second face sheet define a composite structure having an overall thickness that is the same at said first position and at said second position;

after said applying and covering steps, curing said first and second face sheets; and removing said mandrel.

2. The process of claim 1, wherein at least one of said first and second applying steps further comprises applying a plurality of fiber reinforced material layers.

3. The process of claim 2, wherein applying said plurality of fiber reinforced material layers comprises applying a first number of said fiber reinforced material layers in said first position and applying a second number of said reinforced fiber material layers in said second position, wherein said first and second numbers are different.

4. The process of claim 3, wherein said first thickness of said core is greater than said second thickness of said core and said first number is less than said second number.

5. The process of claim 2, wherein at least a portion of said plurality of fiber reinforced material layers are partial layers disposed adjacent to said core.

6. The process of claim 1, wherein said covering step further comprises utilizing a core having one planar surface.

7. The process of claim 1, wherein said applying steps further comprises applying at least one face sheet having a constant thickness along its length.

8. The process of claim 1, wherein said covering step further comprises utilizing a core having an increased density at said first position wherein said first core thickness is less than said second core thickness.

9. The process of claim 1, wherein said first and second applying steps comprise at least one of hand lay-up, filament winding, and fiber placement.

10. The process of claim 9, wherein said first and second applying steps comprise applying pre-impregnated fiber reinforced materials.

* * * * *